P. J. BAUR.
WRAPPING MACHINE.
APPLICATION FILED APR. 17, 1913.

1,075,684.

Patented Oct. 14, 1913.

3 SHEETS—SHEET 1.

WITNESSES

INVENTOR
Philip J. Baur
By Henry C. Evert
ATTORNEY

P. J. BAUR.
WRAPPING MACHINE.
APPLICATION FILED APR. 17, 1913.

1,075,684.

Patented Oct. 14, 1913.

3 SHEETS—SHEET 2.

WITNESSES

INVENTOR
Philip J. Baur
Henry C. Evert
ATTORNEY

P. J. BAUR.
WRAPPING MACHINE.
APPLICATION FILED APR. 17, 1913.

1,075,684.

Patented Oct. 14, 1913.
3 SHEETS—SHEET 3.

WITNESSES

INVENTOR
Philip J. Baur
ATTORNEY

UNITED STATES PATENT OFFICE.

PHILIP J. BAUR, OF PITTSBURGH, PENNSYLVANIA.

WRAPPING-MACHINE.

1,075,684.

Specification of Letters Patent.   Patented Oct. 14, 1913.

Application filed April 17, 1913. Serial No. 761,825.

*To all whom it may concern:*

Be it known that I, PHILIP J. BAUR, a citizen of the United States of America, residing at Pittsburgh, in the county of Allegheny and State of Pennsylvania, have invented certain new and useful Improvements in Wrapping-Machines, of which the following is a specification, reference being had therein to the accompanying drawing.

This invention relates to a wrapping machine, and more particularly to a machine which has been especially designed for expeditiously and economically wrapping loaves of bread produced by large bakeries.

The primary object of my invention is the provision of positive and reliable means, as hereinafter set forth, for wrapping a loaf of bread or other matter in a sheet of especially prepared paper which by the application of heat becomes sealed and forms practically an air-tight inclosure for the loaf of bread or wrapped article.

Another object of this invention is to provide a machine of the above type embodying novel folding fingers that are automatically brought into action to produce overlapping flaps at the ends of a loaf of bread and these flaps are automatically sealed before the wrapped article leaves the machine.

A further object of this invention is to provide a machine of the above type consisting of comparatively few parts that are inexpensive to manufacture, durable, easy to assemble and highly efficient for the purposes for which they are intended.

With the above and other objects in view the invention resides in the novel construction, combination and arrangement of parts to be hereinafter specifically described and then claimed.

Reference will now be had to the drawings, wherein:—

Figure 1:
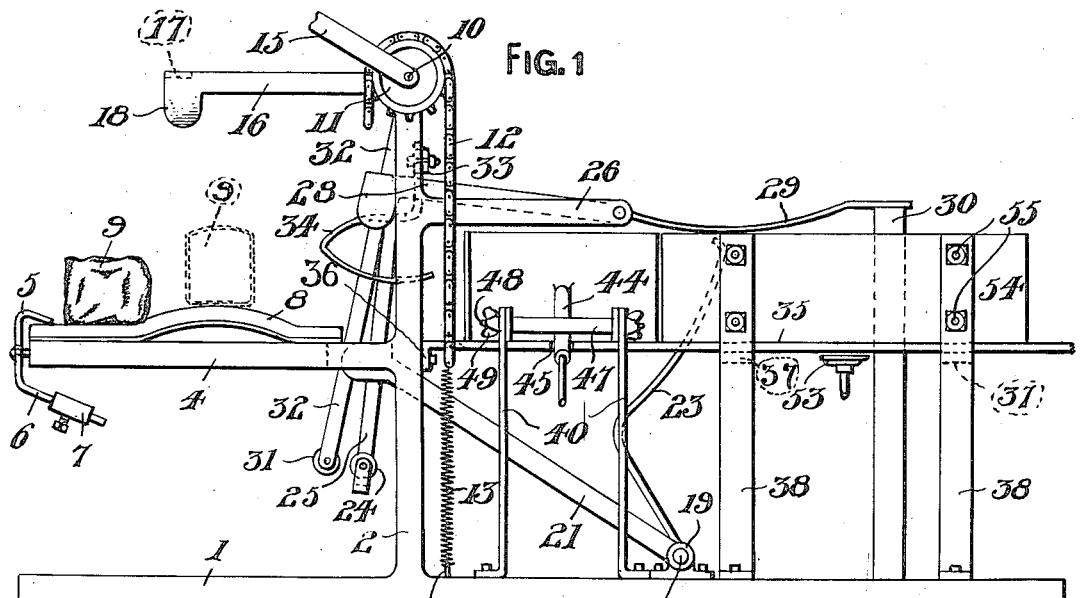
Figure 2:
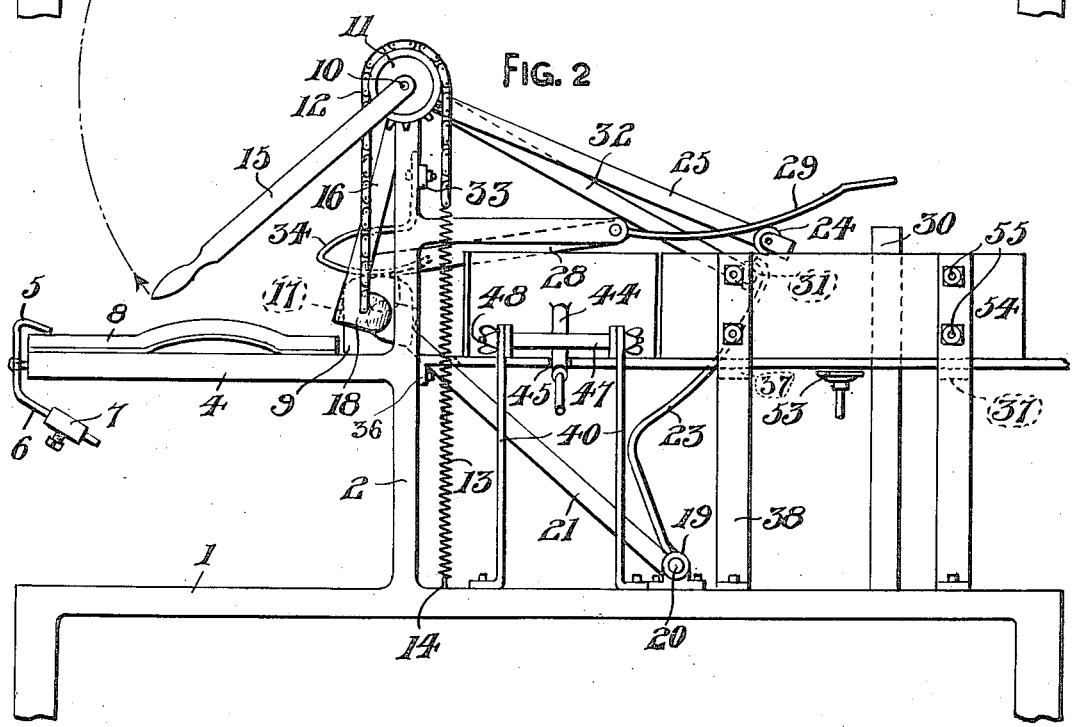
Figure 3:
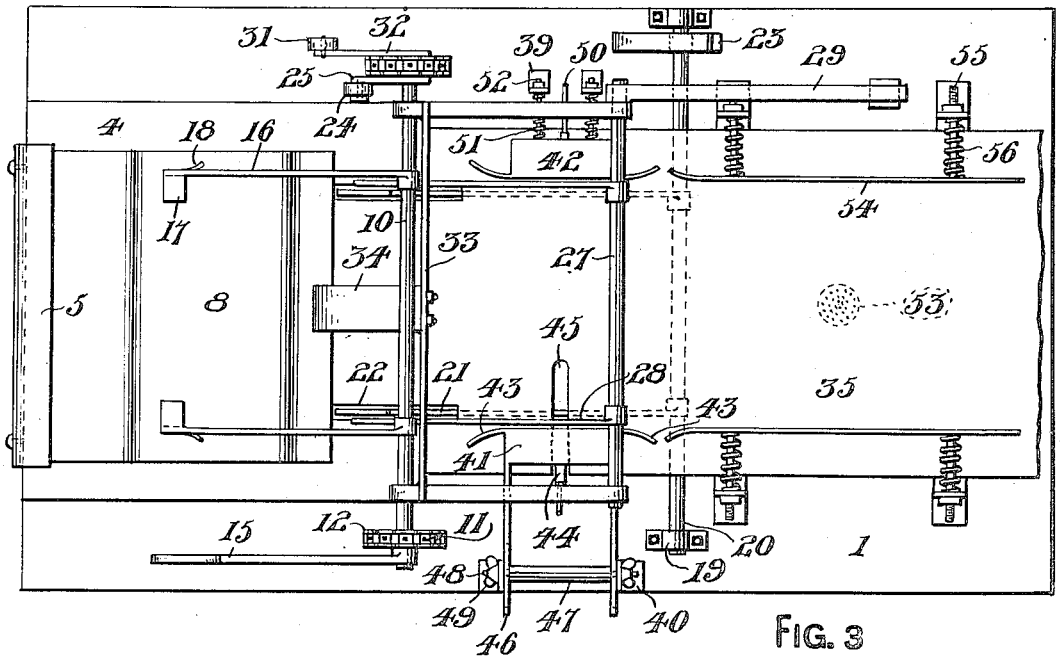
Figure 4:
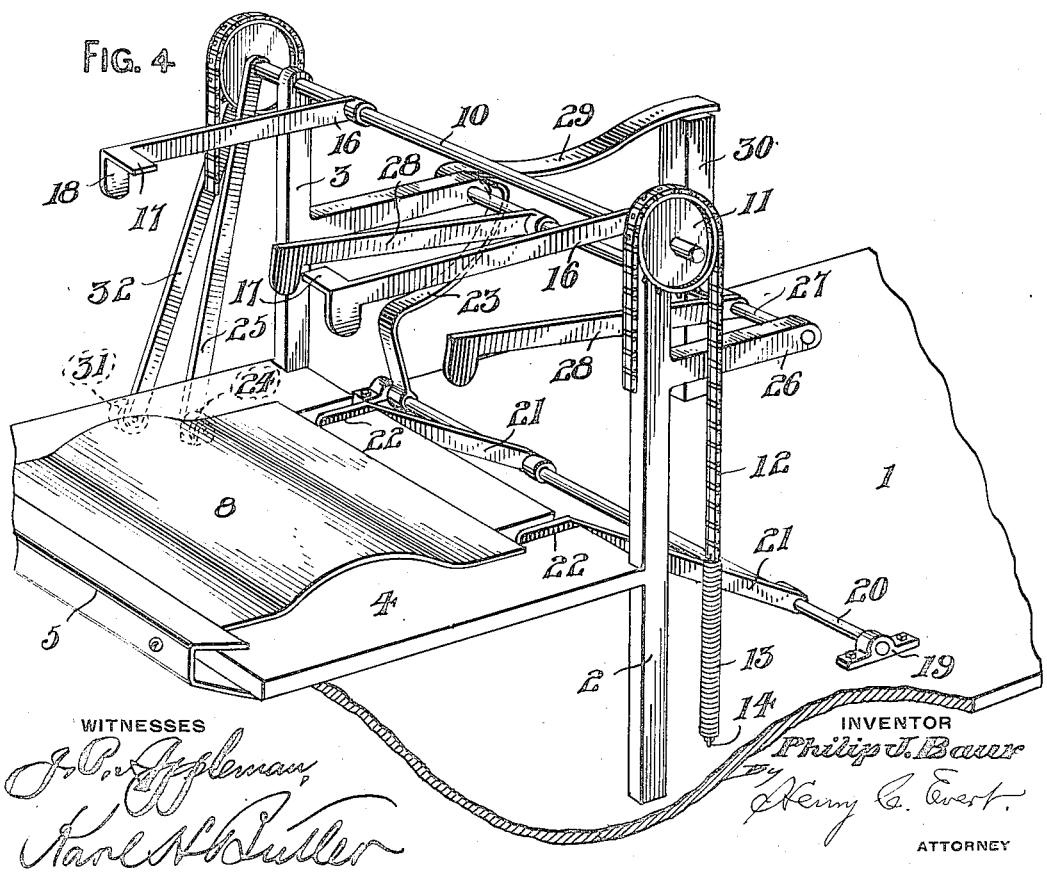
Figure 5:
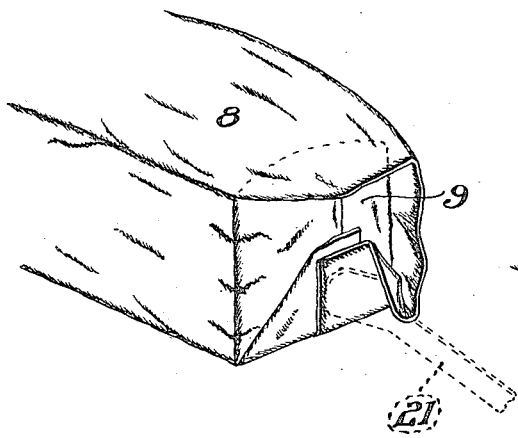
Figure 6:
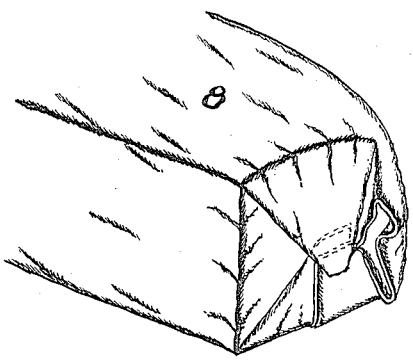
Figure 7:
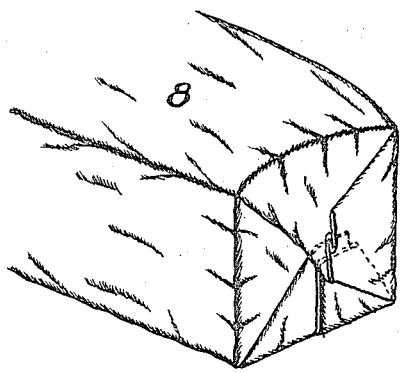
Figure 8:
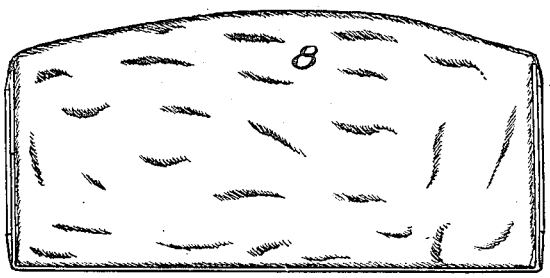

Figure 1 is an elevation of a portion of the machine, Fig. 2 is a similar view showing a loaf of bread partially wrapped, Fig. 3 is a plan of the machine, Fig. 4 is an enlarged perspective view of a portion of the machine illustrating sets of folding fingers, Fig. 5 is a perspective view of a portion of a loaf of bread, illustrating the first two steps in folding the flaps at the end of the loaf of bread, Fig. 6 is a similar view showing a third step, Fig. 7 is a similar view illustrating a fourth step, and Fig. 8 is a side elevation of a loaf of bread completely wrapped and sealed.

Further describing my invention in detail with reference to the accompanying drawings, wherein like numerals denote corresponding parts throughout: 1 denotes a table or other support having the sides thereof provided with oppositely disposed uprights 2 and 3 and these uprights, intermediate the upper and lower ends thereof, are connected by a horizontal platform 4. The forward end of this platform is provided with a gravity holder in the form of an angle strip 5 which has a depending angle arm 6 provided with an adjustable weight 7. The gravity holder engages a pile of sheets or wrappers 8 upon the platform 4 and it is preferable to use paraffined wrapping paper or specially prepared sheets that can be easily and quickly folded around the loaf of bread 9.

10 denotes a main operating shaft journaled in the upper ends of the uprights 2 and 3 and mounted upon the ends of said shaft are sprocket wheels 11 over which there are trained sprocket chains 12. Each chain has an end thereof connected to the upper convolution of a coiled retractile spring 13 and the lower convolution of said spring is connected, as at 14 to the table or support 1.

15 denotes a hand lever mounted upon one end of the shaft 10 and mounted upon said shaft between the uprights 2 and 3 is a set of side flap fingers 16 that are arranged in parallelism and have the outer ends thereof provided with inwardly projecting pushing lugs 17 and beveled folding lugs 18.

19 denotes transversely alining bearings upon the table 1 and journaled in said bearings are the ends of a rock shaft 20. Mounted upon the rock shaft 20 is a set of parallel bottom flap fingers 21 and these fingers are adapted to extend upwardly through slots 22 provided therefor in the rear edges of the platform 4. Mounted upon the shaft 20, adjacent to the upright 3 is a curved crank 23 and this crank is adapted to be engaged by an anti-friction roller 24 carried by a radially disposed arm 25, mounted upon the end of the shaft 10, adjacent to the upright 3.

26 denotes rearwardly extending bearings carried by the uprights 2 and 3 and journaled in said bearings are the ends of a rock shaft 27 upon which there is mounted a set of parallel top flap fingers 28. The end of the shaft 27 adjacent to the upright 3 has a substantially flat crank 29 and this crank is limited in its downward movement by a post 30 carried by the table 1. The weight of the crank 29 is such as to normally support the top flap fingers 28 in an elevated position. The crank 29 is adapted to be engaged by the anti-friction roller 31 of an arm 32, carried by the end of the shaft 10 adjacent to the upright 3.

·33 denotes a transverse brace connecting the uprights 2 and 3, adjacent to the upper ends thereof, and adjustably connected to this brace intermediate the ends thereof is a depending C-shaped yieldable holder 34, the object of which will presently appear.

35 denotes the base of a heating apparatus, said base being in a horizontal plane with the platform 4. The base is connected to the uprights 2 and 3, as at 36 and is supported by inwardly projecting lugs 37 carried by standards 38 located contiguous to the side edges of the table 1.

39 and 40 denote sets of standards adjacent to the uprights 2 and 3 and forward of the standards 38. The standards 39 and 40 are carried by the table 1 and the upper ends of the set of standards 40 support an adjustable heater casing 41, while the upper edges of the standards 39 support a yieldable heater casing 42. These casings extend over the heater base 35 and have the ends of the confronting walls thereof beveled, as at 43 whereby a wrapped loaf of bread can be easily pushed between the heater casings whereby said casings will complete the folding of side flaps and seal all of said flaps due to the application of heat to the paraffined or specially prepared paper. The heater casing 41 contains a conventional 45 form of burner having a gas supply connection 44 and the base 35 is slotted, as at 45 to provide clearance for the burner connection. The heater casing 41 has arms 46 adjustably connected by a spacing sleeve 47, a tie rod 48 and winged thumb nuts 49 to the upper ends of the set of standards 40.

The heater casing 42 has a conventional form of burner provided with a gas supply connection 50 and said heater casing is yieldably supported by coiled springs 51 encircling rods 52, carried by the upper ends of the standards 39 and supporting said heater casing.

53 denotes a mush-room gas burner located beneath the heater base 35. For guiding loaves of bread over the heater base the upper ends of the sets of standards 38 are provided with yieldable longitudinal parallel guides 54. The guides are supported by rods 55 slidably mounted in the upper ends of the standards 38 and encircling said rods, between the standards 38 and the guides 54, are coiled compression springs 56.

In order that the operation of the machine can be fully understood it is thought best to follow out the wrapping and sealing of the loaf of bread 9 shown in Fig. 1. The operator or attendant of the machine wraps the top sheet of paper around the loaf of bread 9 until the longitudinal edges of the sheet of paper overlap. The loaf of bread is then placed in position with the overlapped edges of the sheet of paper beneath the loaf, as shown by dotted lines in Fig. 1. The ends of the sheet of paper then protrude from the ends of the loaf and the loaf of bread is pushed beneath the holder 34. The gravity holder engaging the pile of wrappers, prevents the sheets from following the loaf or becoming accidentally displaced.

The operator or attendant of the machine now raises the hand lever 15 and the shaft 10 is rocked and the coiled retractile springs 13 placed under tension, these springs being used to restore the hand lever 15 and the rock shaft 10 to their normal position when released. As the shaft 10 is rocked the side flap fingers 16 are lowered and brought into action whereby the beveled folding lugs 18 will fold one of the side flaps at each end of the wrapper, as shown in Fig. 5. Simultaneously with the folding of the side flaps the pushing lugs 17 move the loaf of bread farther beneath the holder 34.

As the shaft 10 is rocked the arms 25 and 32 impinge the cranks 23 and 29 and the bottom flap fingers and top flap fingers are shifted to fold the bottom and top flaps, as shown in Fig. 6, these fingers operating substantially in unison. While the fingers are still holding the folded flaps shown in Fig. 6 the pushing lugs 17 are carrying the loaf of bread between the heater casings 41 and 42 and as the ends of the loaf of bread are engaged by the confronting side walls of said casings the remaining side flaps are folded. It is at this point that the hand lever 15 is released and the various fingers restored to their normal position.

The wrapped loaf of bread between the heater casings 41 and 42 has the end flaps thereof sealed by the application of heat to the specially prepared paper and when the next loaf of bread is operated upon by the machine it engages the loaf of bread between the heater casings and forces it along the heater base 35, the wrapped loaf eventually reaching the position over the burner 53, whereby the longitudinal overlapped edges of the wrapper will be sealed. Wrapped loaves of bread are intermittently shifted over the heater base and the length of travel is such that the wrappers are sealed by the heating apparatus before being delivered at the rear end of the machine.

I attach considerable importance to the arrangement of the flaps at the ends of the wrapper, as they are folded in a manner that they cannot become accidentally displaced even though a wrapped loaf of bread is roughly handled. The sealing of the flaps provides an inclosure that is practically air-tight and such an inclosure is conducive to preserving the loaf of bread and retaining the wholesome qualities of the same.

While in the drawings there is illustrated a preferred embodiment of the invention, it is to be understood that the structural elements are susceptible to such changes, as in the size, shape and manner of assemblage as are permissible by the appended claims.

What I claim is:—

1. In a bread wrapping machine, a platform adapted to support a loaf of bread partially inclosed by a wrapper, side flap fingers adapted to fold side flaps of the wrapper and shift a partially wrapped loaf of bread, coöperating top and bottom flap fingers adapted to produce top and bottom flaps, and a heating apparatus adapted to receive a partially wrapped loaf of bread and complete wrapping and sealing the same.

2. In a bread wrapping machine, a platform adapted to support a loaf of bread partially inclosed by a wrapper, side flap fingers adapted to fold side flaps of the wrapper and shift a partially wrapped loaf of bread, coöperating top and bottom flap fingers adapted to produce top and bottom flaps, a heating apparatus adapted to receive a partially wrapped loaf of bread and complete wrapping and sealing the same, and means including a hand operated rock shaft for imparting movement to all of said fingers.

3. In a bread wrapping machine, a platform adapted to support a loaf of bread partially inclosed by a wrapper, side flap fingers adapted to fold side flaps of the wrapper and shift a partially wrapped loaf of bread, coöperating top and bottom flap fingers adapted to produce top and bottom flaps, a heating apparatus adapted to receive a partially wrapped loaf of bread and complete wrapping and sealing the same, means including a hand operated rock shaft for imparting movement to all of said fingers, and means including retractile springs for restoring said rock shaft and all of said fingers to a normal position.

4. In a bread wrapping machine, a table adapted to support a loaf of bread partially inclosed by a wrapper, a heating and sealing apparatus in alinem nt with said table, side flap fingers movable above said table for producing flaps at the ends of said wrapper, coöperating top and bottom flap fingers for producing top and bottom flaps in said wrapper, and means carried by said side flap fingers for shifting the wrapped article into said heating apparatus to produce a final flap.

5. In a bread wrapping machine, a table adapted to support a loaf of bread partially inclosed by a wrapper, a heating and sealing apparatus in alinement with said table, side flap fingers movable above said table for producing flaps at the ends of said wrapper, coöperating top and bottom flap fingers for producing top and bottom flaps in said wrapper, means carried by said side flap fingers for shifting the wrapped article into said heating apparatus to produce a final flap, and means including a hand operated rock shaft for imparting movement to all of said fingers.

6. In a bread wrapping machine, a table adapted to support a loaf of bread partially inclosed by a wrapper, adjustable and yieldable heater casings in proximity to said table, a hand operated rock shaft arranged above said table, side flap fingers carried by said shaft and adapted to produce side flaps in said wrapper, coöperating top and bottom flap fingers movable in proximity to said table and adapted to produce top and bottom flaps in said wrapper, means actuated by said shaft for imparting movement to the last mentioned fingers, and means carried by said side flap fingers for moving said wrapped article between said heater casings to complete the wrapping and sealing of said loaf of bread.

7. In a bread wrapping machine, the combination with a loaf of bread and a wrapper arranged longitudinally thereof, of a platform adapted to support a loaf of bread partially inclosed by a wrapper, a rock shaft movable above said platform, side flap fingers carried by said shaft for producing side flaps in said wrapper and for moving said wrapper upon said platform, rock shafts in proximity to said platform, cranks carried thereby, coöperating top and bottom flap fingers carried by the last mentioned rock shafts for producing top and bottom flaps in said wrapper, and means actuated by the first mentioned rock shaft for engaging said cranks and rocking the shafts thereof.

8. In a bread wrapping machine, a platform adapted to support a loaf of bread partially inclosed by a wrapper, a rock shaft movable above said platform, side flap fingers carried by said shaft for producing side flaps in said wrapper and for moving said wrapped article upon said platform, rock shafts in proximity to said platform, cranks carried thereby, coöperating top and bottom flap fingers carried by the last mentioned rock shafts for producing top and bottom flaps in said wrapper, means actuated by the first mentioned rock shaft for engaging said cranks and rocking the shafts thereof, and means in proximity to said platform and including adjustable and yieldable heater casings for completing the wrapping and sealing of the wrapper about said loaf of bread.

In testimony whereof I affix my signature in the presence of two witnesses.

PHILIP J. BAUR.

Witnesses:
KARL H. BUTLER,
MAX H. SROLOVITZ.